INVENTOR.
HARRY PEDERSEN
BY
Richard W. Treverton

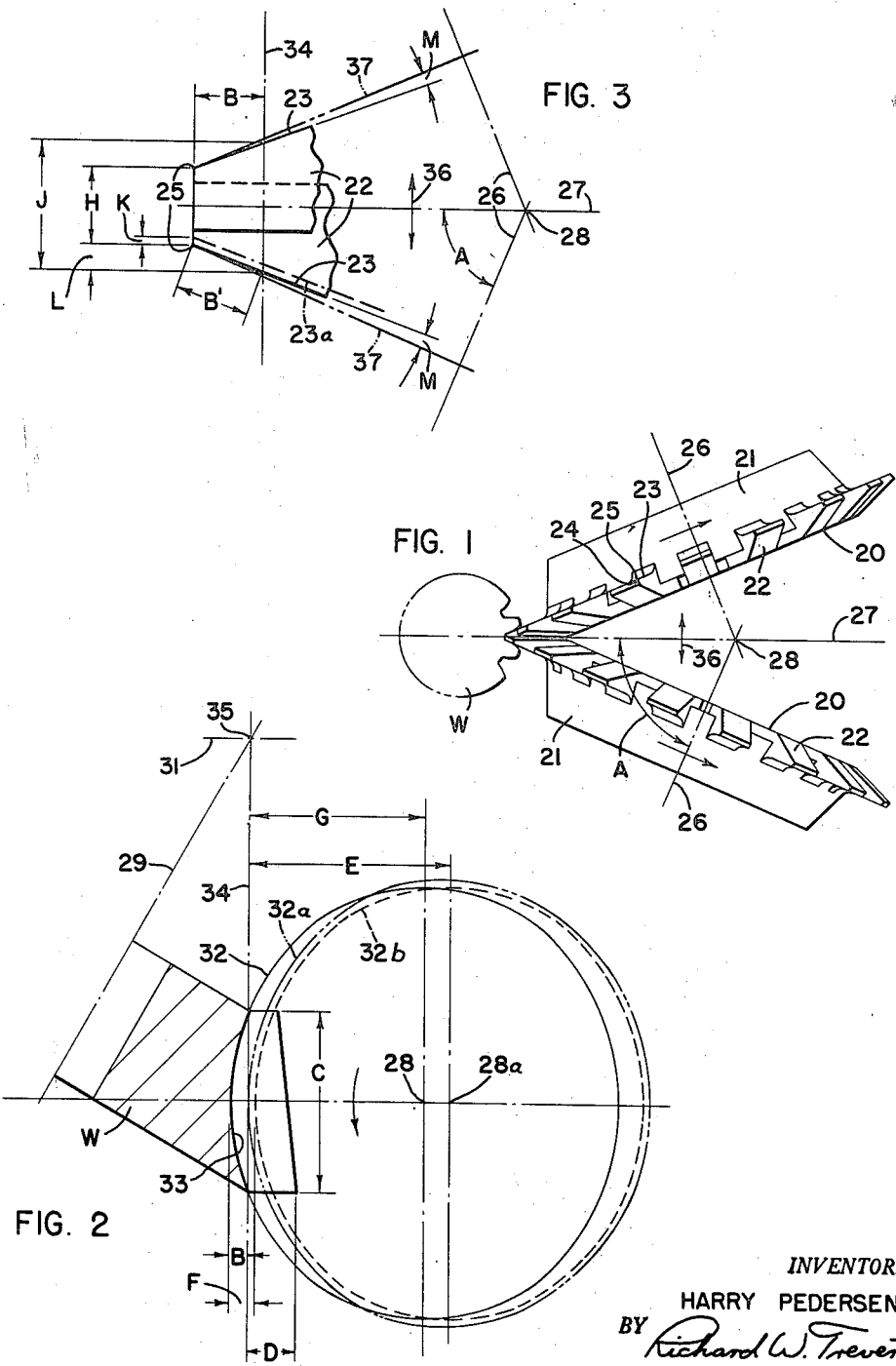
Feb. 12, 1957 — H. PEDERSEN — 2,780,873
GAGING DEVICE
Filed Aug. 27, 1953 — 3 Sheets-Sheet 1
INVENTOR.
HARRY PEDERSEN Feb. 12, 1957
H. PEDERSEN
2,780,873
GAGING DEVICE
Filed Aug. 27, 1953
3 Sheets-Sheet 2
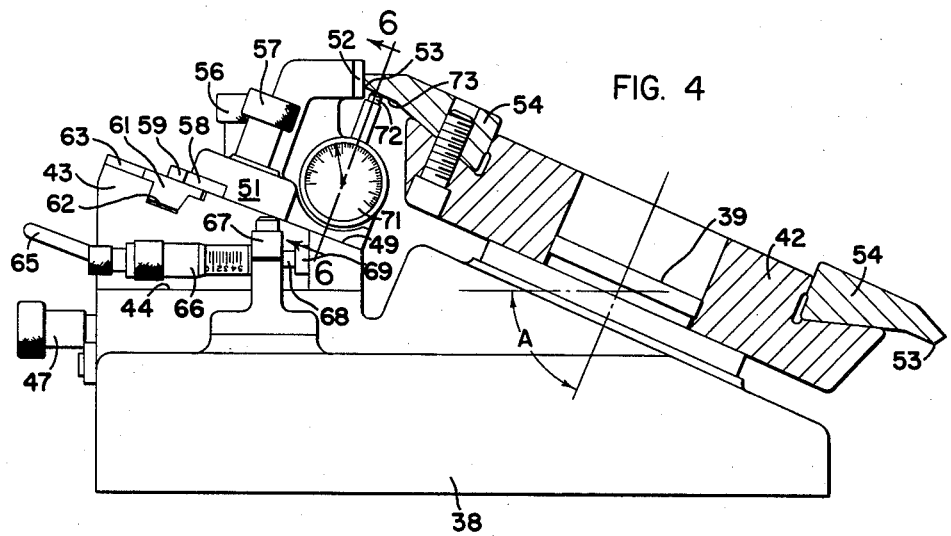
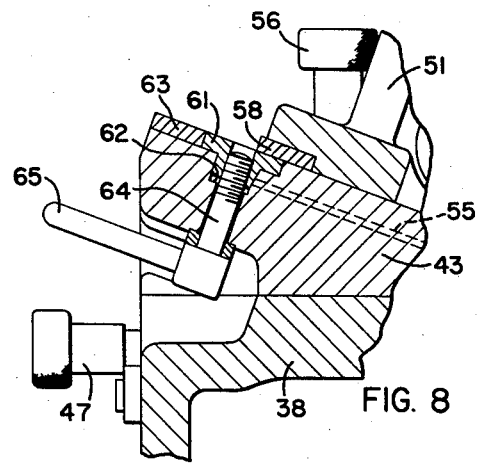
INVENTOR.
HARRY PEDERSEN
BY Richard W. Treverton Feb. 12, 1957  H. PEDERSEN  2,780,873
GAGING DEVICE
Filed Aug. 27, 1953  3 Sheets-Sheet 3

United States Patent Office 2,780,873
Patented Feb. 12, 1957

2,780,873

GAGING DEVICE

Harry Pedersen, Rochester, N. Y., assignor to The Gleason Works, Rochester, N. Y., a corporation of New York Application August 27, 1953, Serial No. 376,869

14 Claims. (Cl. 33—185)

The present invention relates to a gaging device for use with a gear cutting machine having radial bladed cutters, for determining the amounts by which the machine must be adjusted in order to compensate for changes in cutter dimensions from standard, resulting from sharpening of the cutter blades or other causes, and also to compensate for the height of arc of the cutting point in traversing the face width of the gear to be cut.

The kind of gear generating machine to which the invention relates employs a pair of radial bladed cutters arranged to rotate about relatively inclined intersecting axes, with the blades of each cutter extending into the inter-blade spaces of the other so that both cutters can operate simultaneously in the same tooth space of the work. When the blades are resharpened the cutter radius is reduced, necessitating a compensating reduction of the distance between the work axis and the cutter axes in order to cut the tooth spaces to the proper depth. The tip cutting points of the blades move in arcuate paths as they traverse the work with the result that the root surfaces are cut to concave shape. For a cutter of given radius the height of arc of course varies with the face width of the work. Because of the root surface concavity, the bottom clearance between mating teeth is minimum at the tooth ends and the depth of the tooth spaces at their ends is therefore of controlling importance. Accordingly in arriving at a correct machine setting it is necessary to take into account the height of arc as well as any decrease of cutter radius from standard.

The gaging device of the present invention is arranged to give a single reading which represents the change in calculated machine setting necessary to compensate for both of these factors. In order to accomplish this the device includes a means by which a cutter may be compared with a master cutter gage of standard radius, and a means that is adjustable, in accordance with the face width of the gear to be cut, for height of arc compensation.

The effective point width of the pair of cutters, i. e. their point width at the ends of a tooth space, increases with increase of the aforementioned height of arc. The effective point width also may change slightly due to deviations of the cutters from standard. The gaging device includes an indicator to show the total amount of adjustment necessary to compensate for both of these factors.

The foregoing and other objects and advantages of the invention will appear from the following description made with reference to the drawings, wherein:

Fig. 1 is a side elevation of a pair of cutters, showing their positional relation to a gear being cut;

Fig. 2 is a diagram showing various relationships of the cutters to the work gear in a plane through the work axis perpendicular to the plane of Fig. 1;

Fig. 3 is an enlarged view showing tip portions of cutter blades in the plane of Fig. 1;

Fig. 4 is a side elevation of the gaging device, with a master cutter gage thereon appearing in vertical section;

Figure 5:
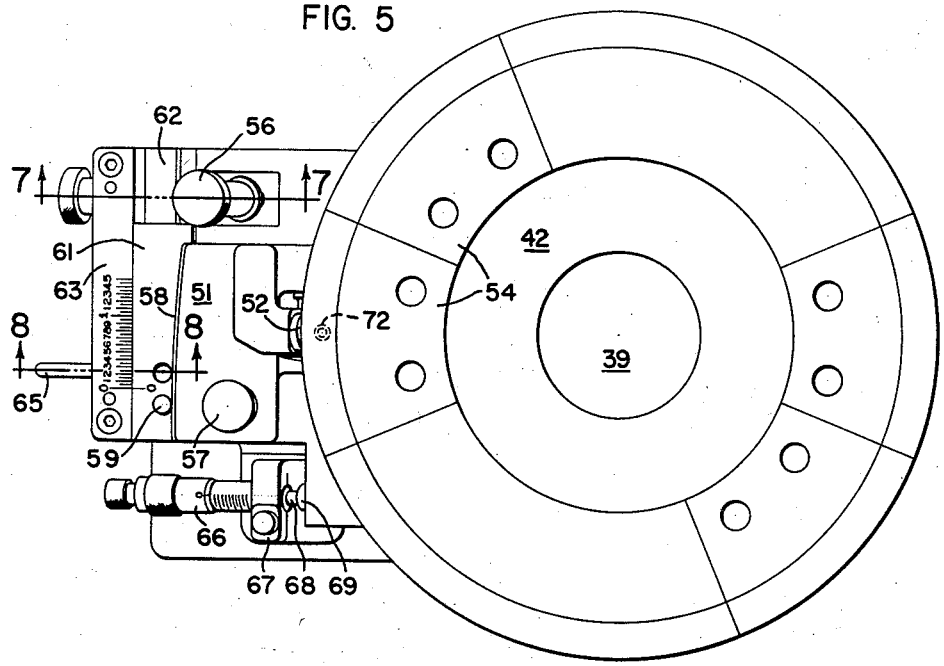
Fig. 5 is an oblique view of the apparatus of Fig. 4 in the plane of rotation of the gage.
Figure 9:
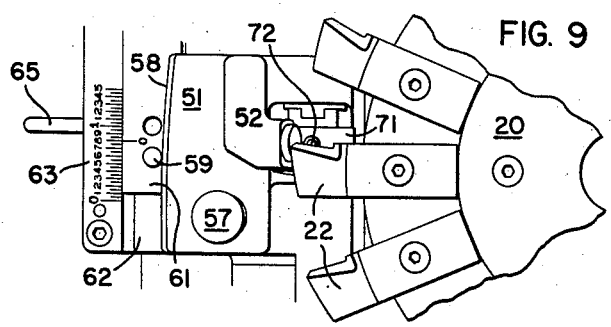

Figs. 6, 7 and 8 are detail sectional views taken respectively in the planes indicated by section line 6—6 in Fig. 4, 7—7 in Fig. 5 and 8—8 in Fig. 5, and, Fig. 9 is a fragmentary view, in the same plane as Fig. 5, showing a cutter mounted on the gaging device.

As shown in Fig. 1 each cutter 20 of the pair comprises a head 21 and radially projecting blades 22 having side cutting edges 23 and tip cutting edges 24 which intersect at cutting points 25. The cutters are adapted for rotation about their respective axes 26, these axes being oppositely inclined at an angle A to plane of symmetry 27 which they both intersect at point 28. The blades of each cutter when in the cutting zone project into the inter-blade spaces of the other cutter, so that both cutters may operate simultaneously in the same tooth space of a work gear W, with their side cutting edges 23 producing the side or working faces of the gear teeth and their tip cutting edges 24 the root surfaces. The blades are relieved back of their side and tip cutting edges, and therefore the cutter radius is decreased as the front faces of the blades are cut back in resharpening. In order to generate the side face of the teeth to the correct profile shape the work is rotated about its axis 29, Fig. 2, in timed relationship to a relative rotation of the cutters and work about an axis 31, the action being such that the cutters represent a tooth of an imaginary generating gear that is rolling in mesh with the work gear. The axis 31, which represents the axis of the generating gear, lies in the plane of symmetry, 27.

In Fig. 2 is shown the relationship between the path 32 of cutting points 25 and the root surface 33 of a bevel work gear W. The root plane 34, which intersects the root surface 33 at the ends of the tooth space, is perpendicular to generating gear axis 31; and axes 29 and 31 intersect at point 35 in this plane. The height of arc which path 32 makes with plane 34, as measured perpendicuarly to the plane, is designated B. The face width of the gear is designated by letter C, and the depth of the tooth space at its large end by letter D. The path 32 of cutting points 25 of cutters of standard radius, if positioned tangent to plane 34, would appear as shown at 32a, and the point of intersection 28 of their axes with the plane of symmetry would be at 28a, at distance E from plane 34. The path of cutting points 25 of cutters of smaller radius, with the same axes intersection point 28a, would appear as shown at 32b. In order for path 32b to coincide with root surface 33 the point 28a must be moved to the left in Fig. 2 by the distance F. The gaging device of the present invention determines the value of F, so that to arrive at the distance G at which intersection point 28 must be spaced from plane 34, in order to cut the tooth spaces to a desired depth D, it is only necessary to subtract F from known dimension E.

Straight bevel gears are ordinarily cut so that their teeth taper toward a cone apex, represented in Fig. 2 by point 35. Accordingly the machine has an adjustment, known as the space angle adjustment, whereby each cutter may be adjusted relative to the other about axis 31, and it is this adjustment which is employed to vary the cutter point width, H in Fig. 3. Such adjustment of course inclines the cutter axes 26 to various angles to the plane of Fig. 1. Accordingly these axes 26 both lie in this plane, which is perpendicular to the plane of symmetry, only when the space angle adjustment is zero, this being the condition depicted in Fig. 1.

Superimposed upon the space angle adjustment is another machine adjustment for each cutter, known as the vertical adjustment, which is made in the direction of arrows 36, Figs. 1 and 3, i. e. in a direction perpendicular to axis 31, in the plane parallel to axis 31 which contains the axis 26 of the particular cutter that is being adjusted. This is the plane in which the angle A is measured.

In order to cut a tooth space of the desired width whose sides taper toward point 35, the space angle settings are made such that the cutting points 25 of a pair of standard radius cutters will have the necessary width J when the circles described by these points 25 are tangent to plane 34, i. e. when axis intersection point 28 is at 28a in Fig. 2. Then, inasmuch as the cutters are moved to the left the distance B in order to cut the correct depth at the tooth ends, a vertical adjustment of each cutter should be made in an amount which will maintain the proper point width J in plane 34. The necessary vertical adjustment should take into account any deviation of the position of side cutting edge 23 from standard. Thus in order to cut a gear of face width C, for which the height of arc is B, using a cutter whose side cutting edge 23 is displaced from standard by distance K, and is therefore at 23a, the vertical adjustment must be upwardly in Fig. 3, through the distance L minus K, as measured from the position of a standard radius cutter positioned (as at 32a, 28a in Fig. 2) to cut to the desired point width J a gear of zero face width (and zero height of arc). The gaging device of the present invention indicates this value, L minus K, in the same set up in which it shows the value F.

As shown in Fig. 3, the side cutting edges 23 usually are inclined at a small angle M, known as the dish angle, to planes 37 perpendicular to the cutter axes 26, for imparting a slight convexity to the tooth surfaces in the direction of their length. Different cutters for use on the same machine may have different dish angles in order to produce varying amounts of such convexity. The pressure angle of the cutter, A minus M, of course decreases with increase of the dish angle.

The gaging device, Figs. 4 to 9, comprises a base 38 having a boss 39 for rotatably supporting either a gear cutter 20, Fig. 9, or a master cutter gage 42, Figs. 4 and 5. A slide 43 is adjustable rectilinearly upon a horizontal plane surface 44 of the base. As shown this surface is inclined to the axis of the boss at the same angle A at which the plane of symmetry 27 is inclined to cutter axis 26, this being twenty-three degrees in the illustrated embodiment. The direction of adjustment of slide 43, toward or away from the boss, is controlled by the interfitting of a tongue 45 on the slide in a groove 46 in the base. This adjustment, which is in a direction parallel to the vertical plane containing the axis of boss 39, is effected by turning a screw 47 that is rotatable on the base and is screw-threaded to a part 48 secured to the slide.

The upper plane surface 49 of the slide is inclined to surface 44 at an angle which as measured in the vertical plane containing the axis of boss 39 is less than the angle A by a small amount. In the illustrated embodiment this amount is three degrees, chosen because it approximates the average of the dish angles M of the various cutters to be gaged. In other words the surface 49 is inclined to surface 44 at an angle of 20° which is the pressure angle of an average cutter. The line of intersection of surface 49, with any plane perpendicular to the vertical plane containing the boss axis, is parallel to surface 44. Movable on surface 49 is a slide 51 having an anvil 52 adapted to engage either the cutting tip 25 of a cutter, as in Fig. 9, or the corresponding edge 53 of one of the several blade-simulating segments 54, as in Figs. 4 and 5. Slide 51 is movable on surface 49 in a direction parallel to the vertical plane containing the boss axis, this direction being governed by the interfitting of a tongue 55 on slide 51 in a groove in slide 43.

After being adjusted on base 38 the slide 43 may be clamped thereto by tightening a nut 56 that is screwthreaded to a stud anchored in the base, as shown in Fig. 7. Similarly the slide 51 may be clamped to slide 43 by tightening a nut 57 that is screw-threaded to a stud anchored in a slide 43.

On slide 51 is a height-of-arc compensating cam 58 adapted to engage a pin 59 on a cross-slide 61. The latter is movable along a groove 62 in slide 43 in a direction perpendicular to the groove that receives tongue 55. The surface of cam 58 that is engageable with pin 59 is of substantially circular arc shape in the plane of surface 49, and, to simplify calibration, is made with a radius of curvature equal to four times the standard radial distance of cutting point 25 from the cutter axis. The position of the cross-slide along groove 62 is shown by a scale 63 secured to slide 43. In the zero position of adjustment of the cross-slide, shown in Fig. 5, the pin 59 contacts the arcuate face of the cam 58 at a point where the tangent to the face is parallel to groove 62. The cross-slide may be clamped to slide 43 in any position of adjustment by tightening a clamp screw 64 by means of lever 65, Fig. 8.

For showing the position of adjustment of slide 43 a conventional micrometer 66 is mounted on the base 38 with its barrel secured to the base by a clamp 67 and with its measuring screw 68 in engageable relation to an anvil 69 on the slide. For measuring variations in the distance between upper surface 49 of the slide and the side cutting edge 23 of a cutter mounted on the device, a dial indicator 71 is mounted on the slide 51 in the manner shown in Fig. 6. The indicator is so positioned that the contact point 72 of its actuating rack may engage a cutter edge 23 or the side face 73 of a gage segment 54.

The edges 53 of all of these segments 54 of the gage 42 are in a common circle that is perpendicular to the axis of the gage, but the conical faces 73 of the several segments are at different angles to the gage axis, corresponding to the different dish angles M of different cutters.

To use the device, the micrometer measuring screw 68 and the slide 43 are first backed off, i. e. are adjusted to the left of their position shown in Figs. 4 and 5. The cross-slide 61 is adjusted into and clamped in its zero position, and the slide 51 is brought into and clamped in the position wherein its cam 58 contacts pin 59. The master cutter gage is next mounted on boss 39 and rotated to bring into radial alignment with anvil 52 the segment 54 that corresponds in dish angle with the particular cutter that is to be gaged. The slide 43 is advanced by turning screw 47 to bring anvil 52 into contact with edge 53 of the segment and is then clamped by tightening nut 56. Micrometer measuring screw 68 is advanced to contact anvil 69 and will at this time read zero if the page 42 is accurate and the micrometer barrel is correctly located on the base 38. Contact point 72 engages gage surface 73 and the bezel of the indicator is now turned to adjust the indicator reading to zero.

Next the gage 42 is replaced by one cutter of the pair that is to be used. Clamp nut 57 and screw 64 are loosened and cross-slide 61 adjusted to bring the reading of scale 63 to the face width of the gear that is to be cut, after which screw 64 is retightened. The slide 51 is adjusted to bring cam 58 against pin 59 and then clamped by tightening nut 57. Because of the arcuate shape of cam 58, the effect of these adjustments has been to withdraw the anvil 52 a distance which for practical purposes is equal to the height of arc, B. Clamp screw 56 is now loosened and adjusting screw 47 turned to advance the slides 43 and 51, as a unit, to contact anvil 52 against a cutting point 25. The cutter is oscillated about the boss 39 while this adjustment is being made, to thereby assure the contact being made when point 25 is at the zenith of its arc, i. e. when point 25 is in the vertical plane which contains the cutter axis. The slide 43 is clamped in this position and the micrometer measuring screw is advanced to contact anvil 69. The value now shown by the micrometer is for practical purposes the distance F, Fig. 2.

The cutter is now oscillated on boss 39 to pass its cutting edge 23 over the contact point 72 of indicator 71. The maximum indicator reading thus obtained represents the value L minus K, Fig. 3. The reason is as follows: The indicator was set to read zero against surface 23 of the master cutter gage when slide 51 was in the zero height of arc position shown in Fig. 5. When slide 51 was subsequently withdrawn, by the amount required to contact cam 58 with pin 59 after cross-slide 63 had been set to the face width of the gear, the effect was to shift the indicator by the distance B', Fig. 3, which is the height of arc B in the plane of surface 49, thereby elevating the indicator by the distance L. This elevation was maintained when the indicator was subsequently advanced horizontally, by movement of slide 43 (with slide 51 clamped thereto) to contact anvil 52 with cutter point 25. Hence if the side cutting edge now contacted by indicator point 72 is in the same location as was surface 73 of the master gage, the indicator will show the distance L. However, if the side cutting edge is at 23a the indicator reading will be decreased by the distance K.

It will be noted that the direction of motion of the contact point 72 relative to the indicator case is at an angle to the vertical. If desired the scale on the dial of the indicator may be made to reflect the vertical component of motion of the contact point. However as the angle is relatively small and the distances measured are also small, a scale showing the amount of the actual motion of the contact point is satisfactory for the vertical adjustment in usual gear cutting operations. If greater accuracy is required the vertical component can be readily computed.

It will be understood that while the gaging device and the mode of operation or use thereof described herein represent the preferred embodiment of the inventive principles involved, they may be changed variously in form and arrangement of parts, and also in manner of use, without departing from the spirit of my invention or from the scope of the appended claims.

What I claim is:

1. A gaging device for use with gear cutting machines having radial bladed cutters, comprising a base, means on the base for rotatably supporting a cutter, a first slide adjustable on the base, a second slide adjustable on the first slide, and the second slide having an anvil for contacting the cutting point of a blade of a cutter supported on the base, the directions of adjustment of both slides being in the same plane containing the axis of the cutter, the direction of adjustment of the first slide being at an acute angle to the direction of adjustment of the second slide which corresponds approximately to the pressure angle of the cutters, and the direction of adjustment of the second slide being approximately at a right angle to said axis.

2. A gaging device according to claim 1 in which there are cooperating means on said slides whereby the distance through which the second slide is adjusted on the first slide may be varied in accordance with the face width of a gear to be cut, to compensate for the height of arc of said cutting point in traversing the face width of the gear.

3. A gaging device according to claim 2 in which the angle between the direction of adjustment of the second slide and the axis of cutter rotation differs from a right angle by approximately the dish angle of the cutters.

4. A gage according to claim 2 in which there is a means for measuring the distance through which the first slide is adjusted on the frame, from a reference position, in order to bring the anvil into contact with said cutting point.

5. A gaging device according to claim 4 in which there is a master cutter gage adapted to be supported on the cutter supporting means on the base, said gage having a surface portion, representing the cutting point of a cutter, adapted to be engaged by the anvil to determine said reference position.

6. A gaging device according to claim 2 in which there is an indicator carried by the second slide and engageable with a side cutting edge of a cutter blade for measuring displacement thereof, substantially in the direction of the axis of the cutter, from a reference position.

7. A gaging device according to claim 6 in which there is a master cutter gage adapted to be supported on the cutter supporting means on the base, said gage having a surface portion, representing the cutting point of a cutter, adapted to be engaged by the anvil, and also having a surface portion, representing a side cutting edge of the cutter, adapted to be engaged by the indicator to determine the reference position for the indicator.

8. A gaging device according to claim 2 in which said cooperating means comprise a third slide adjustable on the first slide in a direction perpendicular to the aforementioned adjustments, and a cam having a face defining a circular arc in a plane approximately perpendicular to the axis of the cutter, the cam being carried by one of the second and third slides and the other one thereof having a stop engageable with said face of the cam.

9. A gaging device according to claim 8 in which there are cooperating calibrations of the second and third slides to relate their position of adjustment to the face width of a gear to be cut.

10. A gaging device for use with gear cutting machines having radial bladed cutters, comprising a base, means on the base for rotatably supporting a cutter, a slide having an anvil for contacting the cutting point of a blade of a cutter so supported, said slide being adjustable relative to the base in a direction approximately perpendicular to the axis of cutter rotation to move the anvil radially of the cutter into and out of contact with said cutting point, a second slide adjustable relative to the base in a direction perpendicular to the first-mentioned direction, and a cam on one slide and a cam follower on the other, the cam presenting to the follower a face which is arcuate in a plane approximately perpendicular to said axis.

11. A gaging device according to claim 10 in which the tangent to the arcuate face, at one point of contact between the face and the follower, is parallel to the direction of adjustment of said second slide.

12. A gaging device for use with gear cutting machines having radial bladed cutters, comprising a base, means on the base for rotatably supporting a cutter, a slide having an anvil for contacting the cutting point of a blade of a cutter so supported, said slide being adjustable relative to the base to move the anvil in a plane axial of the cutter into and out of contact with said cutting point, another slide adjustable relative to the base in another direction, and a cam on one slide and a cam follower on the other for relatively positioning the slides to compensate for variations in height of arc of the cutting point in traversing different gear face widths.

13. A gaging device for use with gear cutting machines having radial bladed cutters, comprising a base, means on the base for rotatably supporting a cutter, a first slide movable on the base, a second slide movable on the first slide, the directions of movement of both slides being in the same plane containing the cutter axis, the second slide having an anvil adapted to contact the cutting point of a blade of a cutter supported on the base, and cooperating means on the slides whereby the distance through which the second slide is moved on the first may be varied in accordance with the face width of a gear to be cut with the cutter, to compensate for the height of arc of the cutting point in traversing the face width of the gear.

14. A gaging device according to claim 13 in which there is a means for indicating the amount of movement of the first slide on the base necessary to move the anvil from a reference position into contact with said cutting point.

References Cited in the file of this patent

UNITED STATES PATENTS

| | | |
|---|---|---|
| 1,949,014 | Gleason et al. | Feb. 27, 1934 |
| 1,969,837 | Earl | Aug. 14, 1934 |
| 2,659,158 | Cobb | Nov. 17, 1953 |

FOREIGN PATENTS

| | | |
|---|---|---|
| 348,831 | Germany | Feb. 16, 1922 |